(12) United States Patent
Levin et al.

(10) Patent No.: US 11,039,083 B1
(45) Date of Patent: Jun. 15, 2021

(54) FACILITATING MOTION CAPTURE CAMERA PLACEMENT

(71) Applicant: Lucasfilm Entertainment Company Ltd., San Francisco, CA (US)

(72) Inventors: John Levin, Mill Valley, CA (US); Mincho Marinov, San Francisco, CA (US); Brian Cantwell, Petaluma, CA (US)

(73) Assignee: LUCASFILM ENTERTAINMENT COMPANY LTD., San Francisco, CA (US)

( * ) Notice: Subject to any disclaimer, the term of this patent is extended or adjusted under 35 U.S.C. 154(b) by 479 days.

(21) Appl. No.: 15/414,097

(22) Filed: Jan. 24, 2017

(51) Int. Cl.
| | |
|---|---|
| *H04N 7/18* | (2006.01) |
| *H04N 5/247* | (2006.01) |
| *G06T 7/70* | (2017.01) |
| *H04N 5/232* | (2006.01) |
| *G06T 7/215* | (2017.01) |
| *G06T 7/292* | (2017.01) |
| *G06T 7/90* | (2017.01) |
| *G06T 13/40* | (2011.01) |

(52) U.S. Cl.
CPC ............ *H04N 5/247* (2013.01); *G06T 7/215* (2017.01); *G06T 7/292* (2017.01); *G06T 7/70* (2017.01); *G06T 7/90* (2017.01); *G06T 13/40* (2013.01); *H04N 5/23216* (2013.01); *H04N 5/23293* (2013.01); *G06T 2207/10024* (2013.01); *G06T 2207/30204* (2013.01); *G06T 2207/30244* (2013.01)

(58) Field of Classification Search
CPC ............... H04N 5/247; H04N 5/23216; H04N 5/23293; G06T 7/215; G06T 7/292; G06T 7/90; G06T 7/70; G06T 13/40; G06T 2207/10024; G06T 2207/30204; G06T 2207/30244
USPC ...................... 348/42, 135, 43, 139; 396/153
See application file for complete search history.

(56) References Cited

U.S. PATENT DOCUMENTS

| | | | | |
|---|---|---|---|---|
| 5,889,550 | A | * | 3/1999 | Reynolds ................. G01S 5/16 348/139 |
| 8,564,641 | B1 | * | 10/2013 | Levin .................. H04N 13/246 348/42 |
| 9,142,024 | B2 | * | 9/2015 | Sullivan ............... G06K 9/3216 |

(Continued)

*Primary Examiner* — Jayanti K Patel
*Assistant Examiner* — Richard B Carter
(74) *Attorney, Agent, or Firm* — Kilpatrick Townsend & Stockton LLP

(57) ABSTRACT

Embodiments can enable motion capture cameras to be optimally placed in a set. For achieving this, a virtual set can be generated based on information regarding the set. Movement of a virtual actor or a virtual object may be controlled in the virtual set to simulate movement of the corresponding real actor and real object in the set. Based on such movement, camera aspects and obstructions in the set can be determined. Based on this determination, indication information indicating whether regions in the set may be viewable by one or more cameras placed in the physical set may be obtained. Based on the indication information, it can be determined an optimal placement of the motion capture cameras in the set. In some embodiments, an interface may be provided to show whether the markers attached to the actor can be captured by the motion capture cameras placed in a specific configuration.

18 Claims, 11 Drawing Sheets

(56) References Cited

U.S. PATENT DOCUMENTS

| | | | | |
|---|---|---|---|---|
| 9,196,074 B1* | 11/2015 | Bhat | ............... | G06T 13/40 |
| 2006/0228101 A1* | 10/2006 | Sullivan | ............... | G06T 7/70 |
| | | | | 396/153 |
| 2009/0167843 A1* | 7/2009 | Izzat | ............... | G06T 7/593 |
| | | | | 348/43 |
| 2013/0282747 A1* | 10/2013 | Cheng | ............... | G06F 16/73 |
| | | | | 707/758 |

* cited by examiner

Time: T

Time: T

Time: T+1

FACILITATING MOTION CAPTURE CAMERA PLACEMENT

BACKGROUND OF THE INVENTION

This disclosure generally relates to computer capture of object motion.

Motion capture is an approach for generating motion data that is based on tracking and recording the movement of real objects. One common application of motion capture is in animation where a realistic sequence of motion, e.g., by a human actor, can be captured and used to represent the motion of an animated object.

In some motion capture systems, an actor wears a black suit covering the actor's face and/or body. A number of makers can be attached to the suit at the actor's face, joints, shoulder, elbow, wrist and etc. The actor then performs a sequence of movements which is digitally recorded by a number of cameras. The recorded data is then processed by a motion capture program.

The motion capture program recognizes the markers as points. If multiple motion capture cameras record the same point in a frame and the locations of the cameras are known, the motion capture program can determine the 3D position of the point using triangulation. The motion capture system may determine 3D positions for all of the points in each of the frames. In some systems, however, use of triangulation may require a relatively large number of motion capture cameras to capture each of the differently positioned points from multiple camera angles. Although only two cameras may be required to triangulate a single point, the two cameras typically need to track the point during each frame. As a result, if only two cameras are used, the motion capture cameras can lose track of a marker as a result of the actor turning around. Thus, when an actor performs a scene with lots of motion, a large number of cameras are typically utilized to ensure that at least two cameras can track each marker during each frame.

One difficulty with prior art on-set motion capture techniques is that placement of cameras for motion capture under those techniques often are through trial and error. The prior art on-set motion capture technique is time consuming and often produces unusable data. This difficulty becomes more acute when the movement of the actor is not known in advance until the director gives the movement instruction on the set. In such situations, motion capture cameras cannot be placed in advance. There is a need to develop a technique to place motion capture cameras more efficiently in a set.

BRIEF SUMMARY OF THE INVENTION

Embodiments can facilitate one or more motion capture cameras to be optimally placed so that an object's or an actor's motion in a set (i.e. a physical set) can be reliably captured. As used herein, the term "actor" is not necessarily limited to human, and it may be referred to as non-human entity, such as a pet, a robot, and the like. In some embodiments, for achieving this, a virtual set can be generated based on information regarding the physical set. The virtual set can include representations of objects, actors, backgrounds and the like that are in the physical set. For example, the virtual set may include a representation of a virtual actor corresponding to a real actor in the physical set. The virtual actor may have one or more virtual markers corresponding to the markers that are to be placed on the real actor's face or body for capturing motion of the real actor.

In some embodiments, movement of a virtual actor or a virtual object may be controlled in the virtual set to simulate movement of the corresponding real actor or real object in the physical set. Such simulated movement may be representative of the positioning of the real actor or the real object during the capturing of the physical set. Based on such movement, camera aspects, such as field of view and/or obstructions in the virtual set can be determined. Based on this determination, indication information indicating whether regions in physical set may be viewable by one or more cameras placed in the physical set may be generated. In one embodiment, the indication information is presented as a "heat map" to indicate whether a region in the physical set can be fully viewable, partially viewed, may not be viewed in the physical set based on the movement of the real actor and the configurations of the cameras placed in the physical set.

In some embodiments, based on the indication information described above, it can be determined an optimal placement of a set of motion capture cameras such that the markers attached to the real actor's face and/or body can be captured by at least two of the motion capture cameras. One or more factors may influence such a determination and thus may be taken into consideration when the optimal placement of the motion capture cameras is determined. For example, the factors may include a number of the motion capture cameras in set that can be placed in the physical set, a required minimum distance between any two of the motion capture cameras placed in the physical set, a required minimum distance between a given motion capture camera and the real actor, and any other factors. In one embodiment, indication information including a set of coordinates indicating positioning of the motion capture cameras for the optimal placement may be generated based on such a determination. The coordinates can be used to guide the physical placement of the motion capture camera in the physical set.

In some embodiments, an interface may be provided to show whether the markers attached to the actor can be captured by the motion capture cameras placed in a specific configuration. A given virtual marker may be displayed with a color to indicate whether the real marker corresponding to the given virtual marker is captured at a given point during the movement of the virtual actor. For example, green may be used to indicate the real marker is captured by at least two motion capture cameras, yellow may be used to indicate the real marker is captured by only one motion capture camera, and red may be used to indicate the real marker is not captured by any motion capture camera. In this way, a user can be enabled to determine coverage of the specific configuration of the motion capture cameras for capturing the motion of the real-actor during the set. The user may be enabled to manipulate the virtual set, for example by moving one or more virtual actors and/or virtual objects around, and/or moving the placement of virtual cameras around.

Other embodiments are directed to systems and computer readable media associated with methods described herein.

DETAILED DESCRIPTION OF THE INVENTION

Indicating Visibility of Regions in the Set

Some embodiments can generate indication information indicating whether a certain region in the physical set can be captured on camera. For achieving this, a virtual set may be generated to simulate the physical set. The virtual set can include representations of one or more virtual actors and/or virtual objects corresponding to real actors and/or objects in the physical set. Information regarding one or more of a camera configured to capture the physical set (e.g., a main camera) may be included in the virtual set. The virtual actor(s) or virtual object(s) in the virtual set may be controlled to simulate movement of the corresponding actor(s) or objects in the physical set. Based on such movement information and the camera information, the indication information, for example a heat map, can be generated to indicate whether a given region in the physical set can be fully, partially, or not viewable by the main camera in the physical set. Such indication information can be used to facilitate the optimal placement of one or more motion capture cameras in the physical set.

Figure 1:
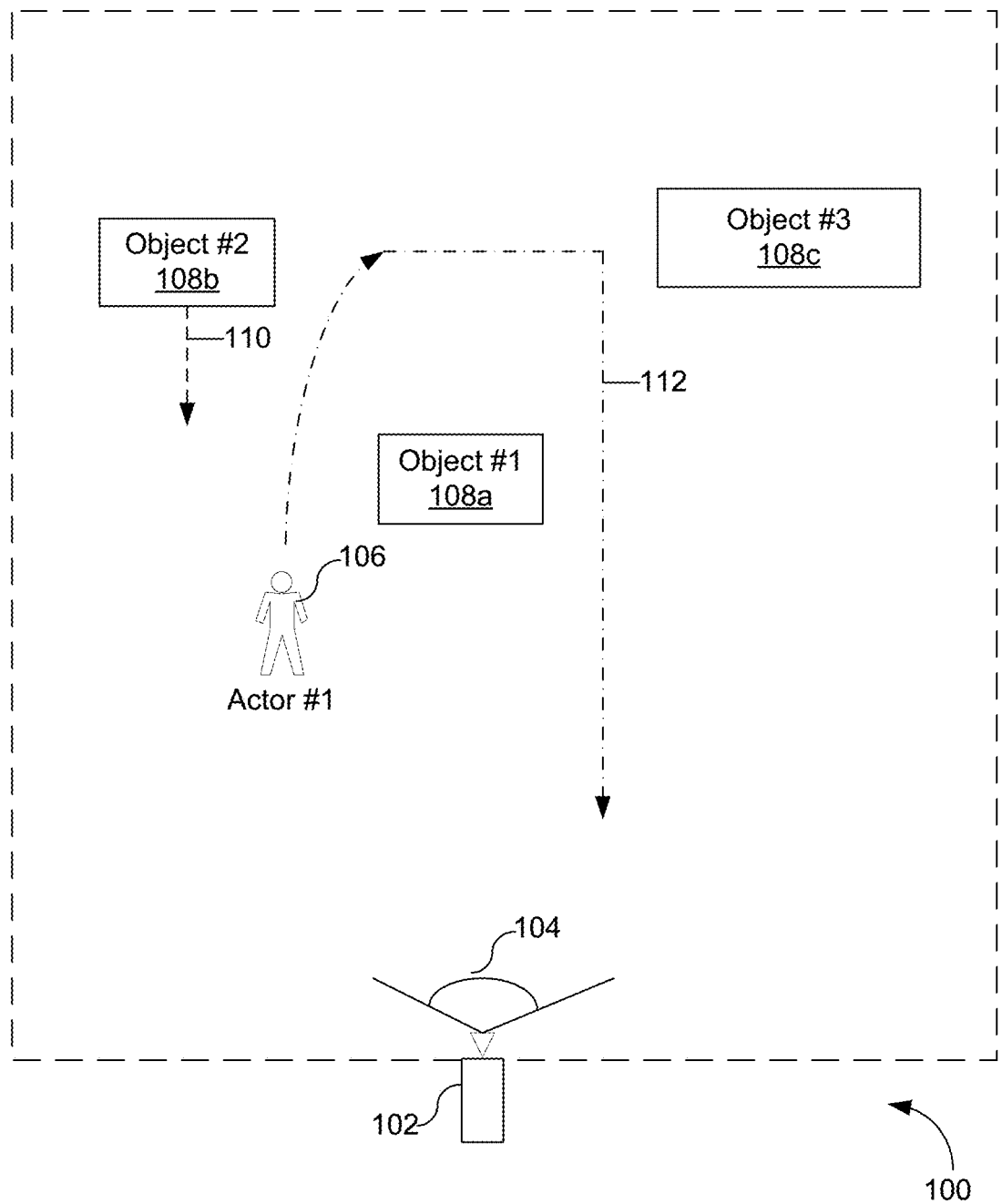
FIG. 1 illustrates an example of a virtual set that can be created in accordance with the disclosure.

FIG. 1 illustrates an example of a virtual set 100 that can be generated in accordance with the disclosure. The virtual set 100 may be generated using information regarding a physical set. Such set information may include information indicating positioning of one or more real actors and/or real objects in the physical set, movement of the one or more real actors and/or real objects over a time period during capturing of the physical set, characteristics of the main camera(s) configured to capture the physical set, and/or any other aspects. Various sources may be used to obtain such set information. For example, the positioning information regarding the real actors and/or objects in the physical set may be obtained from a set director after "contents" in physical set is finalized. The movement information may be obtained from a director in advance of the capturing of the physical set. For instance, the director may instruct the actors in the physical set how to move around in the physical set before shooting the physical set. The camera information may indicate positioning of the main camera(s) configured to capture the physical set (these cameras are distinguished from the motion capture cameras in that they are used to shoot the physical set, and thus they may be referred to as "main cameras"), a quantity of the main cameras (i.e., how many main cameras are set up to shoot the physical set), a field of view (FOV) of a given one of the main camera(s), a height of the given main camera, an orientation of the given main camera, a motion of the given main camera (e.g., panning, zooming, rotating, or a combination of such). Such camera information can be obtained from the director or the camera crew in advance of capturing the physical set.

In one example, the generation of the virtual set can be finalized and based on the information described in the preceding paragraph several minutes before the actual shooting of the physical set. In that example, information regarding the contents of the physical set can be first obtained, e.g., from a source that describes a scenic design of the set (e.g., the set director, a document that describes such, a tool such as the 3D Lidar scanner, or a blueprint of the set, or the like). Based on such information, the virtual set can be generally generated to include positioning of one or more virtual actors and/or virtual objects corresponding to the real actors and/or real objects in the physical set. After the virtual set is created, it may be adjusted based on instructions from the director before shooting of the physical set, which typically happens 10 minutes before the shooting.

In the example shown in FIG. 1, the virtual set 100 includes camera information regarding a main camera 102 that is set up to capture a physical set corresponding to the virtual set 100. As mentioned above, the camera information can indicate a field of view of the camera 102 such as the FOV 104 shown in FIG. 1, a positioning of the camera 102, a height of the camera 102, an orientation of the camera 102, one or more motions of the camera 102 when capturing the physical set, and/or any other information. It should be understood although only one camera 102 is illustrated in FIG. 1, this is not intended to be limiting. There can be more than one main camera set up to capture the physical set in some other examples. Information regarding each of the cameras in those examples can be obtained and included in the virtual set 100.

As illustrated in FIG. 1, there can be a number of virtual objects in the virtual set 100. The virtual objects can correspond to real objects placed in the physical set. In this example, there are three virtual objects in the virtual set, 108a-c namely. The positioning of the virtual objects 108a-c in the virtual set 100 can reflect the positioning of the corresponding real objects in the physical set. As also shown, movement information regarding one or more of the virtual objects in the virtual set can be obtained and included in the virtual set to simulate movement of the corresponding real objects in the physical set during the capturing of the physical set by camera 102. In this example, the virtual object 108b moves as indicated by the dotted arrow 110 in the virtual set 100 to reflect the movement of the corresponding real object during the capturing of the physical set by camera 102. As mentioned above, the movement information regarding the real object may be obtained from the director when he/she gives an instruction on how the real object corresponding to virtual object 108*b* may move in the physical set before capturing of the physical set. However, this is not necessarily the only case. It is contemplated that the movement information regarding the real object corresponding to virtual object 108*b* may be obtained from a database where information regarding how a same or similar scene involving the physical set is captured previously.

The virtual set 100 may include one or more virtual actors representing corresponding real actors in the physical set. In this example, virtual actor 106 is illustrated. It should be understood although only one virtual actor 106 is illustrated in FIG. 1, there can be more than one virtual actor in the virtual set 100 in some other examples to represent multiple corresponding real actors in the physical set in those examples. As shown, the virtual set 100 can include movement information regarding the virtual actor(s). In this example, the virtual actor 106's movement in the virtual set 100 as indicated by the dotted arrow 112 associated with the virtual actor 106 reflects the corresponding real actor's movement in the physical set.

In some examples, the movement of the virtual actor 106 and/or the virtual object 108*b* as indicated by the dotted arrows 110 and 112 may be simulated automatically after the movement information regarding them are obtained. However, this is not necessarily the only case. In some examples, the movement of the virtual actor 106 and/or the virtual object 108*b* may be simulated by inputs provided by a user. For example, in those examples, after the virtual set 100 is generated, it may be presented through an interface and the user may be enabled to drag the virtual actor 106 and/or virtual object 108 to simulate their movements in the virtual set accordingly.

Figure 2:
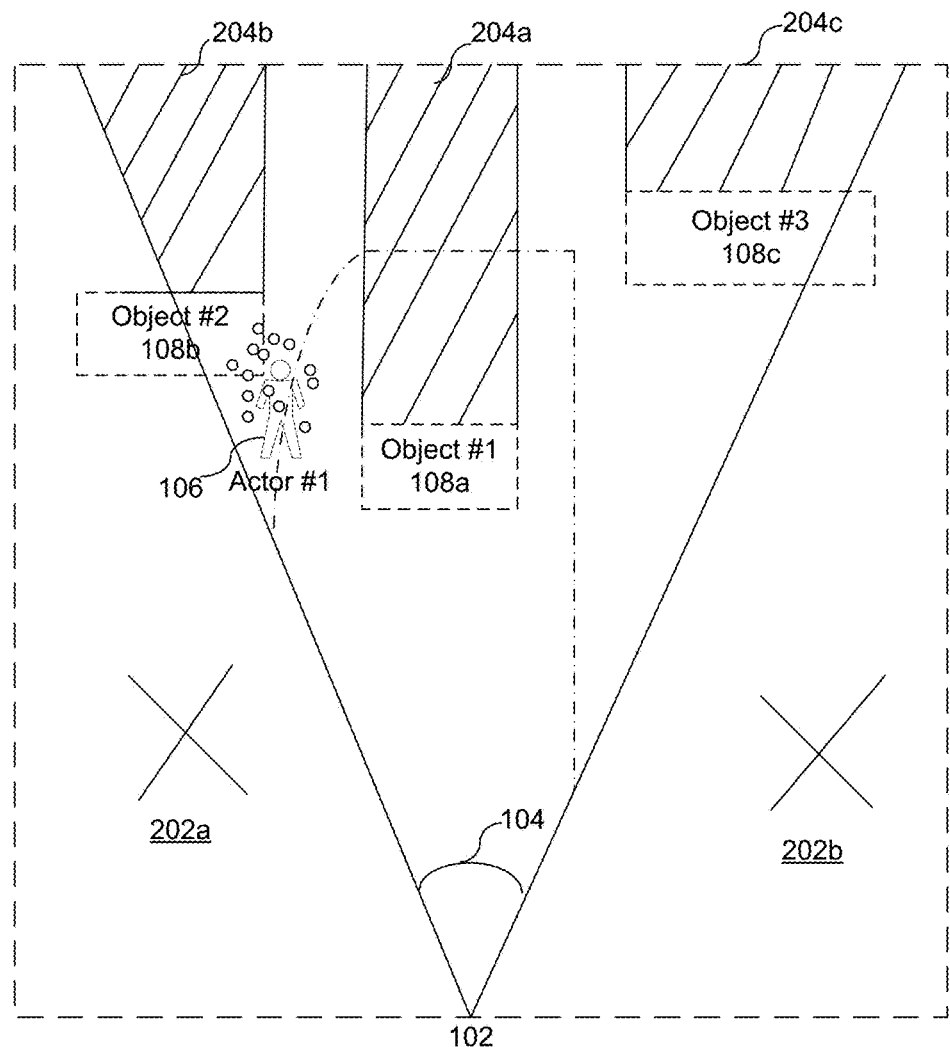
FIG. 2 conceptually illustrates at a given point of time during the capturing of the physical set corresponding to the virtual set shown in FIG. 1, certain regions in the physical set may not be fully viewable or may be partially viewable through a main camera.

The inventors had insights that certain regions in the physical set may not be captured by the camera 102 due to a number of factors, such as field of view of the main camera, the positioning of the real actor(s) and/or real object(s) in the physical set, their movements in the physical set and/or any other factors. Once the virtual set 100 is generated, the configuration of camera 102 is known, and the movement of the virtual objects and/or actors is simulated, it can be known whether a region in the virtual set corresponding to a region in the physical set can be captured by camera 102 through the virtual set 100. FIG. 2 conceptually illustrates at a given point of time during the capturing of the physical set corresponding to the virtual set 100 certain regions in the physical set may not be fully viewable or may be only partially viewable through camera 102. It will be described with reference to FIG. 1. For ease of descriptions, the regions described below are referred to as the regions in the virtual set 100 as well as the corresponding regions in the physical set. As shown, at a given point in time T during the simulation of the virtual set 100, regions 202*a-b* may not be captured by the camera 102 because they are outside the field of view 104 of the camera 102. As also shown, shaded regions 204*a-b* may also not be captured by camera 102 because these regions are obstructed from the camera 102 by virtual objects 108*a-b* respectively. This obstruction is mainly due to the positioning of the virtual objects 108*a-b* with respect to the positioning of camera 102, and the height and orientation of the camera 102.

As also illustrated in FIG. 2, regions marked with white round dots may represent regions in the physical set that may or may not be captured by camera 102 at time T. These regions may be referred to as partially-viewable regions in the physical set. In this example, the partial visibility of the regions marked with white dots may be attributed to the movement of virtual actor 106 and virtual object 108*b*. Their movements may affect whether these regions will be obstructed from camera 102. That is, although the movement of the virtual actor 106 can be simulated in the virtual set 100 with movement information as described above, this simulation may not be accurate in reflecting the actual movement of the real actor when the physical set is actually captured. For instance, the actual movement path of the real actor may be slightly off from the path indicated by the dotted arrow 112 associated with virtual actor 106 as shown in FIG. 1. The real actor may move faster or slower than the simulated movement of the virtual actor 106 in the virtual set 100. Such factors may also be applied to the movement of the real object corresponding to the virtual object 108*b*. These factors may affect the positioning of the real actor corresponding to the virtual actor 106 and/or real object corresponding to the virtual object 108*b*. That is, the positioning of the virtual actor 106 and the virtual object 108*b* at time T in the virtual set may not accurately reflect the actual positioning of the corresponding real actor and the real object during the scene at time T. Taking this potential inaccuracy in the movement information into consideration, the areas with white dots in the virtual set may represent regions that may be or may not be captured by camera 102.

In implementations, a margin of inaccuracy may be set for the movement of the real actor corresponding to the virtual actor 106 and the movement of the real object corresponding to the virtual object 108*b*. For example, a zone surrounding the virtual actor 106 may be predefined such that regions within this zone may be marked as partially-viewable regions for the camera 102.

Another reason why the regions marked with white dots can be attributed to the configuration of camera 102, which may prevent those regions from being fully viewable through camera 102. For example, the height of camera 102 or an orientation of the camera 102 may prevent those regions from being completely captured by camera 102— e.g., only some areas in those regions above a certain height may be captured by camera 102.

In any case, according to the insights described above and herein, indication information indicating whether a region in the physical set can be fully viewable, partially viewable, or not viewable through camera 102 can be generated based on the "contents" of virtual set 100 (e.g., how the real actor(s) and/or real object(s) are positioned in the physical set), movements of the virtual actor(s) and/or real object(s) in the virtual set 100, configurations of the camera 102, and/or any other aspects at a given time. In one embodiment, such indication information is generated as a heat map with colors or cross-hatched patterns filled in different regions in the virtual set 100 to indicate whether corresponding regions in the physical set can be viewed through camera 102.

Figure 3:
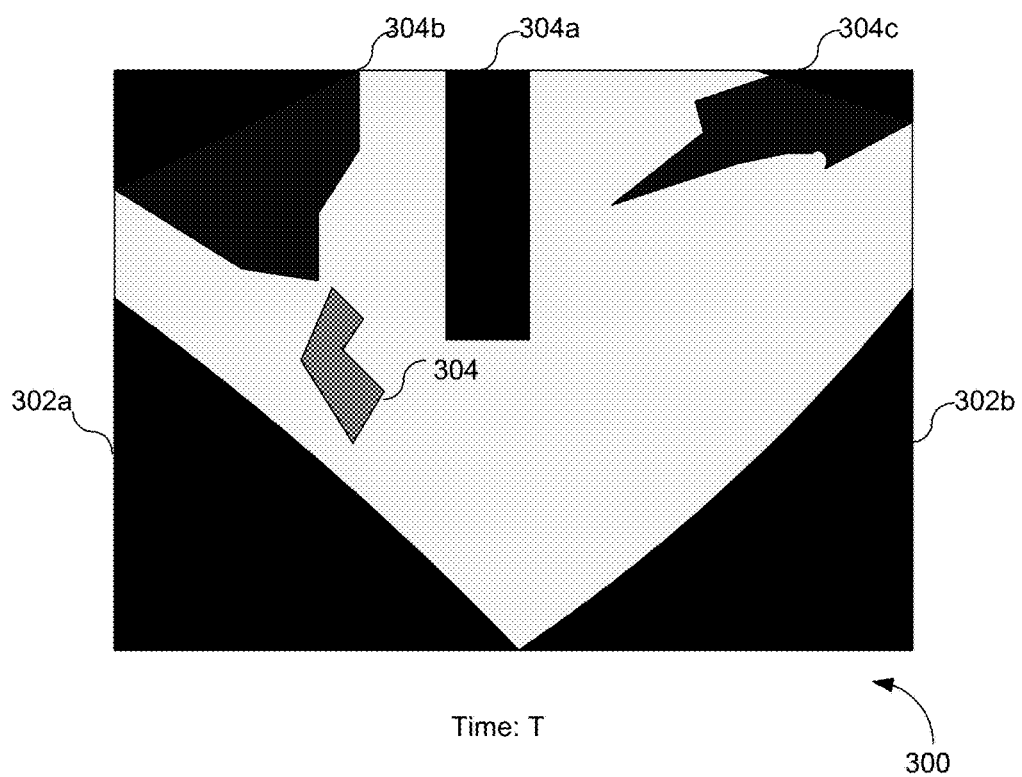
FIG. 3 illustrates an example of a heat map that can be generated to indicate whether a region in the physical set can be viewed at a given point of time a main camera.

FIG. 3 illustrates an example of a heat map 300 that can be generated to indicate whether a region in the physical set can be viewed at a given point of time T through a main camera. As shown, the heat map 300 in this example includes regions 302*a-b* and 304*a-c* that cannot be viewed by the main camera at time T due to obstructions and/or configurations of the main camera as explained above. These regions can be marked with a first color (e.g., black) to indicate that they cannot be viewed through camera 102 at the given time T. As also shown, the heat map 300 can include one or more of a region such as region 304 that may be partially viewable through camera 102 as explained above. These regions can be marked with a second color (e.g., grey) to indicate that can be partially viewed at the given time T. The heat map 300 can also include one or more regions that can be viewed through the camera 102 and these regions can be marked using a third color (e.g., white) to show these regions can be viewed through the camera 102. It should be understood the marking of different regions in the virtual set 100 with respect to their visibility to the camera 102 is not limited to colors. In some other examples, different regions may be marked with different crosshatched patterns to indicate their visibility to camera 102.

It should be understood although the example of heat map 300 shown in FIG. 3 is for a given time T, this is not necessarily the only case. In some other examples, a heat map 300 can be generated to indicate whether a given region in the physical set can be fully viewable through the main camera(s) 102 over a time period. For example, as illustration, if a region can be fully viewable through the main camera(s) 102 during an entirety of that time period, then that region may be marked with the first color or first cross-hatch pattern; if the region can be fully viewable for less than 20% of that time period, and cannot be viewable for more than 70% of that time period, then that region may be marked with the third color or third cross-hatched pattern as being not viewable at all; if the region can be fully viewable between 20%-30% of that time period, and can be partially viewable for more than 50% of that time period, that region may be marked with the second color or second cross-hatched pattern as being partially viewable. Other examples are contemplated.

In some embodiments, the heat map 300 may be presented in an interface. Such an interface can be used to visually aid a user to determine where to place motion capture cameras for capturing motion of an actor or an object. Naturally, more motion capture cameras should be placed to capture the regions that are marked with a color or a cross-hatched pattern indicating they are fully viewable through the camera(s) 102 (i.e., the main camera(s)), less or no motion capture cameras should be placed to capture the region that are marked with a color or a cross-hatched pattern indicating they are not viewable at all through the camera(s) 102, and an appropriate amount of motion capture cameras should be place the regions that are marked with a color or a cross-hatched pattern indicating they are partially viewable through the camera(s) 102.

Figure 4:
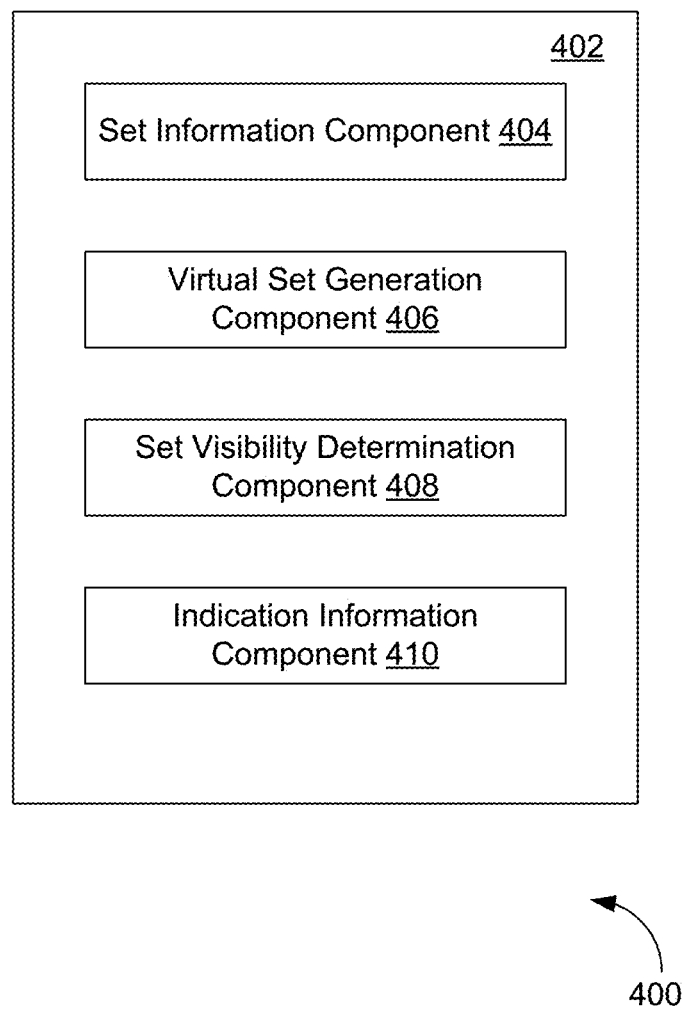
FIG. 4 illustrates an example of a system configured for generating indication information indicating whether a region in the physical set is fully, partially, or not viewable through a main camera in accordance with the disclosure.

With generation of indication information for indicating whether a given region in the physical set is viewable having been conceptually described through FIG. 1-3, attention is now directed to FIG. 4 where an example of a system 400 configured for generating the indication information in accordance with the disclosure is illustrated. It will be described with reference to FIGS. 1-3. As shown, the system 400 may include one or more of a processor 402 configured to execute program components, which may include a set information component 404, a virtual set generation component 406, a set visibility determination component 408, an indication information component 410, and/or any other components.

The set information component 404 can be configured to receive set information regarding a set. The set may include one or more actors and/or objects. The set information can include camera configuration information indication a configuration regarding a main camera configured to capture the set, which may include a position of the main camera in the set, an orientation of the main camera, a field of view of the main camera, a height of the main camera, one or more motions engaged by the main camera over a time period, and/or any other aspects. The set information can include position information indicating positioning of the one or more actors and/or the objects in the set. In some embodiments, the position information may be associated with corresponding time stamps to indicate the positioning of the actors and/or the objects over the time period. In some embodiments, the set information can include movement information regarding the one or more actors and/or the objects over the time period. In some embodiments, the set information may be received from various sources such as a document that describes scene design of the set, a director, a program configured to analyze one or more images of a set, just to name a few.

The virtual set generation component 406 can be configured to generate a virtual set based on the set information received by the set information component 404. The virtual set generated by virtual set generation component 406 can include representations of the one or more actor and objects in the set—i.e., the virtual actors corresponding to the one or more actors in the set, and virtual object corresponding to the one or more objects in the set. The positions of virtual actors and objects in the virtual set may reflect the positions of the corresponding to actors and objects in the set. An example of a virtual set that can be generated by virtual set generation component 406 is illustrated in FIG. 3. In some embodiments, generating the virtual set by the virtual set generation component 406 may include simulating a movement of an actor and/or a movement of an object in the virtual set based on the movement information described herein.

The set visibility determination component 408 can be configured to determine whether a region in the set is fully viewable, partially viewable, or not viewable through the main camera based on the virtual set generated by the virtual set generation component 406. As described here, due to obstructions caused by the positioning and/or movements of the actors and/or the objects in the set, certain regions in the set may not be viewable at through the main camera at the given point of time, while certain regions in the set may be fully viewable at the given point of time. As also described herein, certain regions in the set may be partially viewable through the main camera at the given point time due to the configuration of the main camera and/or movements of the actors and objects in the physical set. For example, at the given point of time, an actor in the physical set may or may not actually move into a position to obstruct a region from the main camera due to the actual movement of the actor may not be known precisely in advance when the virtual set is generated and the actor's movement is simulated in the virtual set. In that example, that region may be determined as being partially viewable through the main camera at the given point of time.

The indication information component 410 may be configured generate indication information indicating whether a region in the set is fully, partially or not viewable through the main camera at a given point of time based on the determination made by the set visibility determination component 408. In some embodiments, the indication information component 410 may be configured to visually present the indication information to a user such that a region in the set that is determined as being fully viewable is marked with a first color and/or a region in the set that is determined as being partially viewable is marked with a second color that is different from the first color. In one embodiment, such indication information is generated as a heat map with colors marking different regions in the virtual set to indicate whether corresponding regions in the physical set can be viewed or partially viewed through camera. FIG. 3 illustrates an example of a heat map that can be generated by the indication information component 410.

Figure 5:
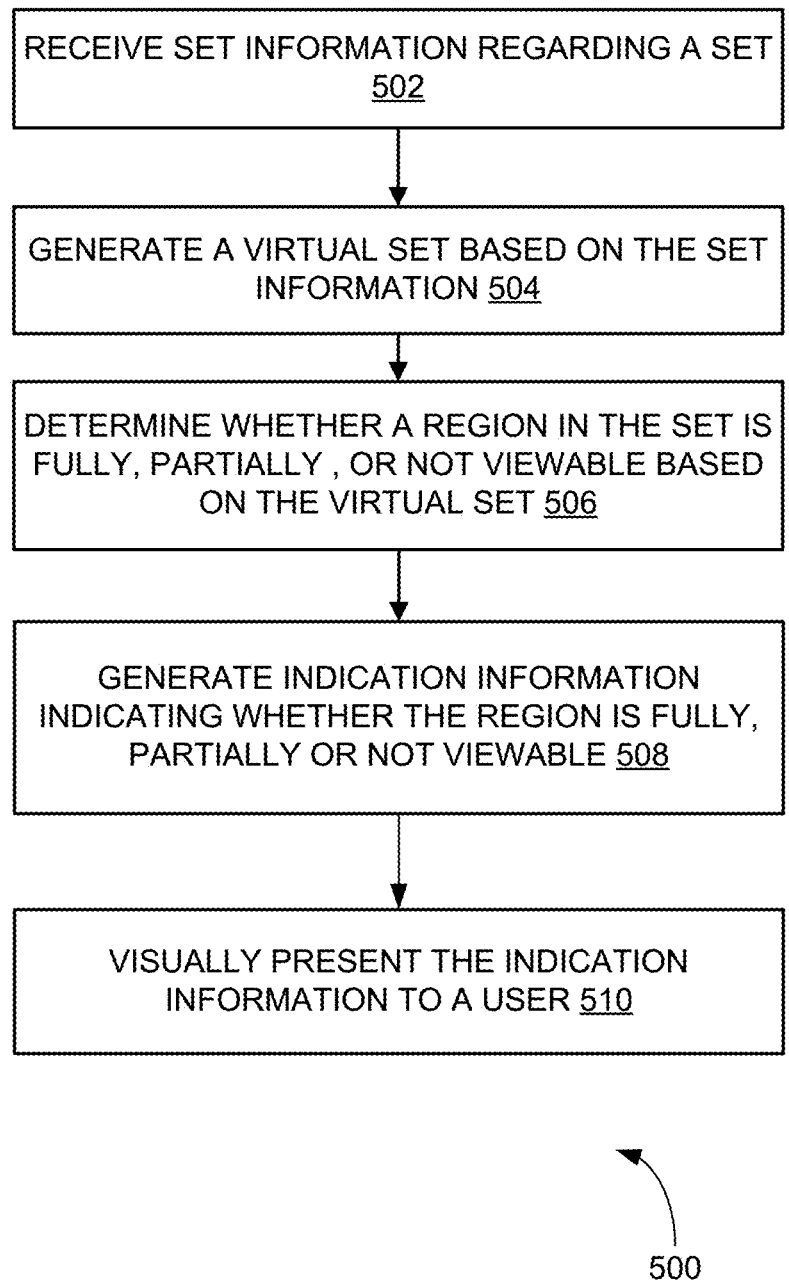
FIG. 5 is a flowchart of an exemplary method for generating indication information indicating whether a region in a set is fully, partially, or not viewable through a main camera.

Attention is now directed to FIG. 5. FIG. 5 is a flowchart of an exemplary method 500 for generating indication information indicating whether a region in a set is fully, partially, or not viewable through a main camera in the set as described and illustrated herein. The method presented in FIG. 5 and described below is intended to be illustrative and non-limiting. The particular series of processing steps depicted in FIG. 5 is not intended to be limiting. It is appreciated that the processing steps may be performed in an order different from that depicted in FIG. 5 and that not all the steps depicted in FIG. 5 need be performed. In certain implementations, the method 500 may be generated by an animation system, such as the system 100 shown in FIG. 1.

In some embodiments, the method depicted in method 500 may be generated in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 500 in response to instructions stored electronically on an electronic storage medium. The one or more processing devices may include one or more devices configured through hardware, firmware, and/or software to be specifically designed for execution of one or more of the operations of method 500.

At 502, set information regarding a set can be received. The set information received at 502 can include camera configuration information indication a configuration regarding a main camera configured to capture the set, position information of one or more actors and/or objects in the set, movement information regarding the one or more actors and/or the objects over the time period, and/or any other aspects. In some embodiments, the set information may be received from various sources such as a document that describes scene design of the set, a director, a program configured to analyze one or more images of a set, just to name a few. In some implementations, operations involved in 502 may be performed by a set information component the same as or substantially similar to set information component 404 described and illustrated herein.

At 504, a virtual set may be generated based on the set information received at 502. The virtual set generated at 504 may include one or more virtual actors corresponding to the one or more actors in the set and/or virtual objects corresponding to the one or more objects in the set. The positions of virtual actors and objects in the virtual set may reflect the positions of the corresponding to actors and objects in the set. An example of a virtual set that can be generated at 504 is illustrated in FIG. 3. In some embodiments, generating the virtual set at 504 may include simulating a movement of an actor and/or a movement of an object in the virtual set based on the movement information described herein. In some implementations, operations involved in 504 may be performed by virtual set generation component the same as or substantially similar to virtual set generation component 406 described and illustrated herein.

At 506, a determination whether a region in the set is fully, partially, or not viewable through the main camera may be made based on the virtual set generated at 504. As described here, due to obstructions caused by the positioning and/or movements of the actors and/or the objects in the set, certain regions in the set may not be viewable at through the main camera at the given point of time, while certain regions in the set may be fully viewable at the given point of time. As also described herein, certain regions in the set may be partially viewable through the main camera at the given point time due to the configuration of the main camera and/or movements of the actors and objects. The determination made at 506 may be based on the "contents" of virtual set generated at 504—e.g., how the real actor(s) and/or real object(s) are positioned in the physical set, movements of the virtual actor(s) and/or real object(s) in the virtual set 100, configurations of the camera 102, and/or any other aspects. In some implementations, operations involved in 506 may be performed by a set visibility determination component the same as or substantially similar to set visibility determination component 408 described and illustrated herein.

At 508, indication information indicating whether a region is fully, partially or not viewable through the main camera may be generated based on the determination made at 506. The region may be indicated as fully, partially, or not viewable at a given point time or over a time period. For example, as illustration, if a region is determined as being fully viewable throughout the entirety of that time period, then that region may be marked with the first color or cross-hatched pattern; if the region can be fully viewable less than 20% of that time period, and cannot be viewable for more than 70% of that time period, then that region may be marked with the third color or cross-hatched pattern as not being viewable; if the region can be fully viewable between 20%-30% of that time period, and can be partially viewable for more than 50% of that time period, that region may be marked with the second color or cross-hatched pattern as partially viewable. Other examples are contemplated In some implementations, operations involved in 508 may be performed by indication information component the same as or substantially similar to indication information component 410 described and illustrated herein.

At 510, the indication information generated at 508 may be visually presented to a user. In one embodiment, the indication information is presented to the user as a heat map with colors marking different regions in the virtual set to indicate whether corresponding regions in the physical set can be viewed or partially viewed through camera. FIG. 3 illustrates an example of a heat map that can be generated at 510. In some implementations, operations involved in 508 may be performed by indication information component the same as or substantially similar to indication information component 410 described and illustrated herein.

Motion Capture Camera Placement

Figure 6:
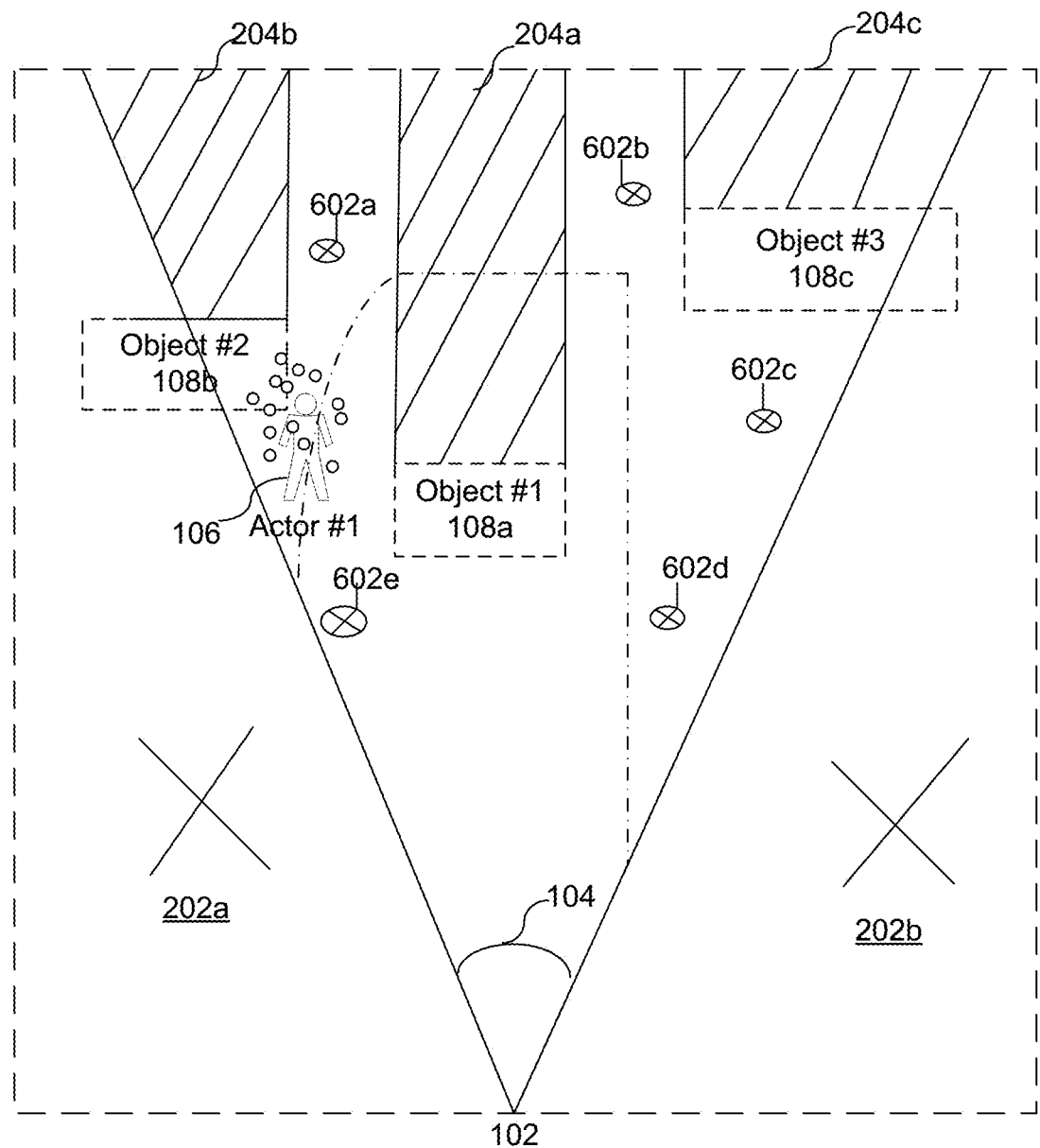
FIG. 6 illustrates an example of a virtual set that is marked with indicators for an optimal placement of the motion capture cameras.

Some embodiments can facilitate an optimal placement of motion capture cameras in a physical set. For example, a determination as to where to place the motion capture cameras for capturing motions of an actor or an object in the physical set can be automatically made based on the virtual set, the simulated movement of the actor and/or the object, and/or the indication information described and illustrated herein after the indication information is generated. For instance, based on the indication information, it may be determined that no motion capture cameras may be placed to capture regions that are not viewable at all, more motion capture cameras may be placed to capture regions that are fully viewable, and an appropriate number of motion capture cameras may be placed to capture regions that are partially viewable. FIG. 6 illustrates an example of virtual set 100 that is marked with indicators for an optimal placement of the motion capture cameras. As shown in this example, indicators 602a-d are placed at corresponding positions in the virtual set 100 to indicate those positions may be suitable for placing motion capture cameras. The indicators 602a-d placed in the virtual set as shown in FIG. 6 can aid a user to place the motion cameras in the physical set. For example, after the indicators 602*a-d* are placed in the virtual set, the user can use the coordinates of these indicators as a guide to actually place the motion cameras in the physical set.

In some implementations, a number of factors may be taken into consideration when determining the positions for optimally placing the motion capture cameras as shown in FIG. 6. For example, the factors may include a number of the motion capture cameras that are available and can be placed in the physical set, a required minimum distance between a given motion capture camera and the actor 106, a minimum distance between a given motion capture camera and one or more objects in the set, and/or any other factors. Such factors may be taken into consideration for achieving a good motion capture coverage of the actor 106's movement. A goal for an optimal camera placement in accordance with the disclosure is to ensure each marker on the actor's face and/or body is captured from at least 2 cameras at all times, with an adequate resolution for image-based feature tracking.

In some embodiments, for determining whether placement of motion capture cameras in a specific configuration (e.g., as shown FIG. 6) is optimal, an interface may be provided to indicate whether the markers attached to the actor 106 can be captured by motion capture camera in the specific configuration at different time points during simulated movement of the actor in the virtual set. Since the positions of the markers on the actor's face and/or body can be known in advance and the positions of the motion capture cameras in the specific configuration are known in the virtual set 100, the visibility of those markers to the motion capture cameras can also be known.

Figure 7A:
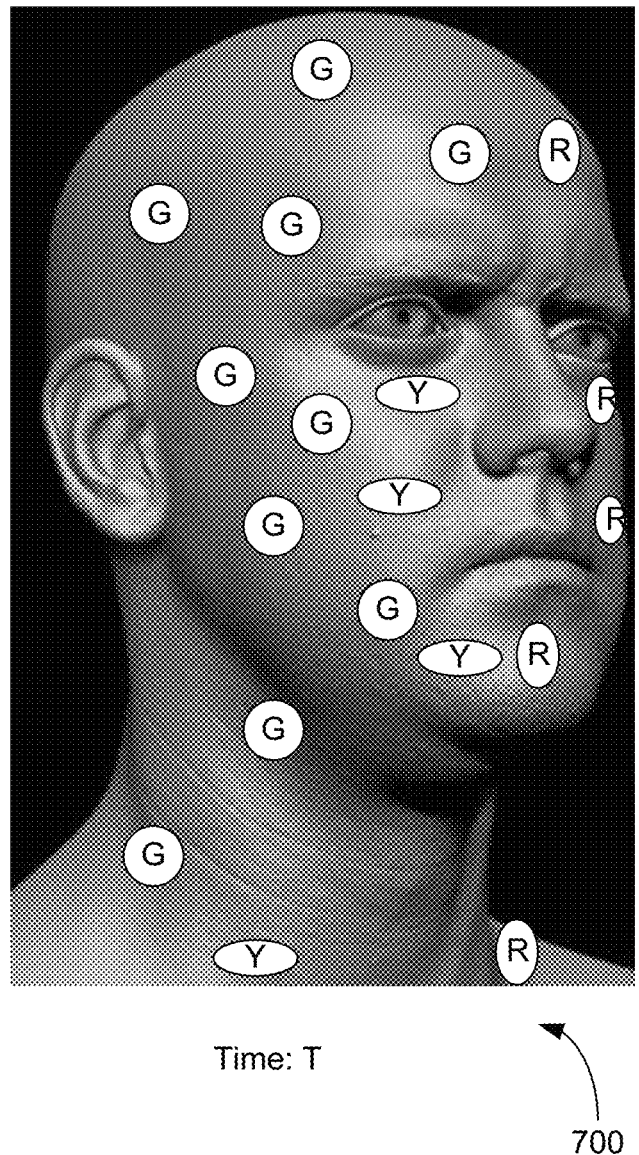
FIG. 7A illustrates an interface is provided at time T with a set of virtual markers colored with different colors to indicate their visibility to the motion capture cameras placed in a specific configuration.
Figure 7B:
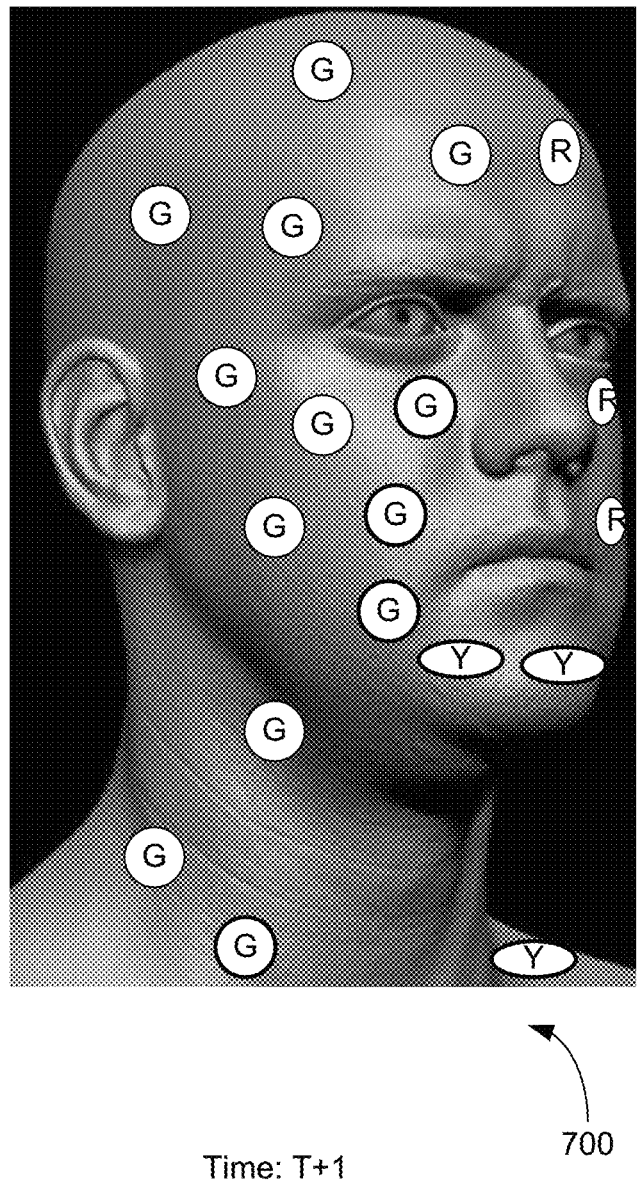
FIG. 7B shows, as the simulated movement of the actor is progressing in the virtual set, the colors of the virtual markers can change at time T+1.

FIGS. 7A-B illustrate an example of an interface 700 provided to show whether one or more markers attached to the actor can be captured by motion capture cameras placed in the specific configuration at a given point of time. They will be described with reference to FIGS. 1-2. In some embodiments, the interface 700 may be provided after the positions of motion capture cameras are marked in the virtual set 110, for example, by software or by a user. After those positions are marked, the movement of the actor 106 can be simulated in the virtual set 100 in accordance with the dotted arrow 112. The interface 700 can be provided during the simulation of the actor's movement—for example while actor movement is simulated by the user in the virtual set 100 (e.g., when the user is dragging the actor 106 along the path specified by the dotted arrow 112), the interface 700 can be provided. However, this is not necessarily the only case. In some embodiments, the interface 700 may be provided after the simulation of the actor's movement in the virtual set 100 is completed.

As shown, a virtual marker corresponding to a real marker attached to the actor may be displayed with a color to indicate whether the real marker can be captured by the motion capture cameras placed in the specific configuration (such as shown in FIG. 6) at the given point of time during the simulated movement of the virtual actor. In this example, virtual markers colored with green (i.e., the circles with G) indicate the real markers corresponding to those virtual markers can be captured by at least two motion capture cameras in the configuration; virtual markers colored with yellow (i.e., the circles with Y) indicate the real markers corresponding to those virtual markers can be captured by only one motion capture cameras in the configuration; and virtual markers colored with red (i.e., the circles with R) indicate the real markers corresponding to those virtual markers cannot be captured by any motion capture camera in the configuration.

FIG. 7A illustrates interface 700 is provided at time T with a set of virtual markers colored with different colors to indicate their visibility to the motion capture cameras placed in the specific configuration. FIG. 7B shows, as the simulated movement of the actor is progressing in the virtual set, the colors of the virtual markers can change to indicate certain virtual markers not visible to the motion capture cameras previously may become visible to the motion capture cameras, and vice versa. In this example, the colors of the virtual markers with bold edges as shown in FIG. 7B have changed compared with FIG. 7A. This could be due to the simulated movement of the actor 106 in the virtual set has altered the visibility of the real markers to the motion capture cameras in the configuration at time T+1 as compared to at time T.

Interface 700 may enable a user to determine whether a configuration of motion capture cameras placed in the virtual set is optimal for capturing the actor's motion. For example, the user may adjust the placement of the motion capture camera in the virtual set if the interface 700 shows a certain marker is not visible to at least two motion capture cameras in this configuration for more than 80% time. Other examples are contemplated.

Figure 8:
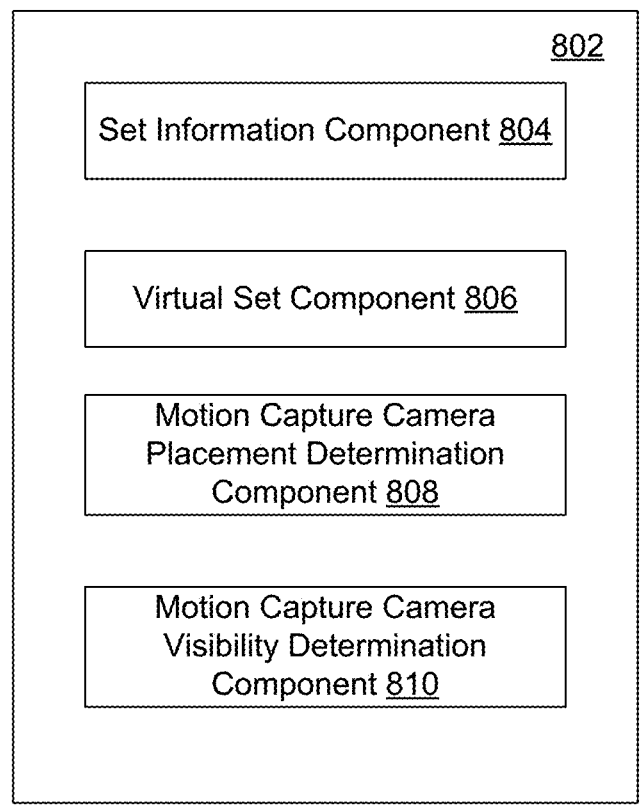
FIG. 8 illustrates an example of a system configured for providing an interface to show whether a marker attached to an actor can be captured by motion capture camera in a specific configuration at different time points during a simulated movement of the actor in a virtual set in accordance with the disclosure.

Attention is now directed to FIG. 8 where an example of a system 800 configured for providing an interface to show whether a marker attached to an actor can be captured by motion capture camera in a specific configuration at different time points during a simulated movement of the actor in a virtual set in accordance with the disclosure is illustrated. It will be described with reference to FIGS. 6 and 7A-B. As shown, the system 800 may include one or more of a processor 802 configured to execute program components, which may include a set information component 804, a virtual set component 806, a motion capture camera placement component 808, a motion capture camera visibility determination component 810, and/or any other components.

The set information component 804 can be configured to receive set information regarding a set. The set may include one or more actors and/or objects. The set information can include camera configuration information indication a configuration regarding a main camera configured to capture the set, which may include a position of the main camera in the set, an orientation of the main camera, a field of view of the main camera, a height of the main camera, one or more motions engaged by the main camera over a time period, and/or any other aspects. The set information can include position information indicating positioning of the one or more actors and/or the objects in the set. In some embodiments, the position information may be associated with corresponding time stamps to indicate the positioning of the actors and/or the objects over the time period. In some embodiments, the set information can include movement information regarding the one or more actors and/or the objects over the time period. In some embodiments, the set information may be received from various sources such as a document that describes scene design of the set, a director, a program configured to analyze one or more images of a set, just to name a few.

The virtual set component 806 can be configured to generate a virtual set based on the set information received by the set information component 804 and simulate a movement of an actor or an object in the virtual set. The virtual set generated by virtual set component 806 can include a virtual actor corresponding to the actor in the set, and/or a virtual object corresponding to the object in the set. The positions of virtual actor and object in the virtual set may reflect the positions of the corresponding real actor and real object in the physical set. An example of a virtual set that can be generated by virtual set component 806 is illustrated in FIG. 3. In some embodiments, simulating the movement of the actor or the movement of the object in the virtual set by the virtual set component 806 may be based on the movement information included in the set information as described herein. In some embodiments, the simulation of the movement of the actor or the movement of the object in the virtual set by the virtual set component 806 can be based on inputs provided by a user.

The motion capture camera placement component 808 may be configured to determine a configuration of motion cameras to be placed in the physical set. In some embodiments, the determination made by the motion capture camera placement component 808 may be made based on the indication information described and illustrated here after the indication information is generated. For instance, based on the indication information, it may be determined that no motion capture cameras may be placed to capture regions that are not viewable at all, more motion capture cameras may be placed to capture regions that are fully viewable, and an appropriate number of motion capture cameras may be placed to capture regions that are partially viewable. In one embodiment, the motion capture camera placement component 808 may be configured to determine one or more positions in the virtual set for optimally placing the motion capture cameras in the set. FIG. 6 illustrates one example of a virtual set that is marked with indicators indicating positions determined by the motion capture camera placement component 808 for placing motion capture cameras.

As described above, a number of factors may be taken into consideration for the determination of optimal placement of the motion capture camera placement by the motion capture camera component 808. For example, the factors may include a number of the motion capture cameras that are available and can be placed in the physical set, a required minimum distance between a given motion capture camera and the actor 106, a minimum distance between a given motion capture camera and one or more objects in the set, and/or any other factors. Such factors may be taken into consideration for a good coverage of the actor 106's movement for capturing the actor 106's motion.

The motion capture camera visibility determination component 810 may be configured to determine whether a configuration of motion capture cameras is optimal. This may involve determining a coverage of each marker attached to the actor in the set by the motion capture cameras in the set. For instance, a given marker attached to the actor can be tracked during a movement simulation of the virtual actor in the virtual set and can be determined whether this marker can be captured by at least two motion capture cameras or at least one motion capture camera. This determination can be made based on the position of the virtual actor in the set at a given point of time during the simulated movement of the actor in the virtual set and the positions of the motion capture cameras marked in the virtual set, e.g., by the motion capture camera placement component 808 or by a user. In some embodiments, the motion capture camera visibility determination component 810 can be configured to provide a percentage of time when the given marker can be captured by at least two motion capture cameras in the configuration, only one motion capture camera in the configuration, or cannot be captured by any motion capture camera in the configuration.

In some embodiments, the motion capture camera visibility determination component 810 may be configured to provide an interface to indicate whether the markers attached to the actor 106 can be captured by motion capture cameras placed in a specific configuration. FIGS. 7A-B illustrate an example of such an interface. As shown, in the interface, a virtual marker corresponding to a real marker attached to the actor may be displayed with a color to indicate whether the real marker can be captured by the motion capture cameras placed in the specific configuration (such as shown in FIG. 6) at the given point of time during the simulated movement of the virtual actor. For example, virtual markers can be colored with green (i.e., the circles with G) indicate the real markers corresponding to those virtual markers can be captured by at least two motion capture cameras in the configuration; can be colored with yellow (i.e., the circles with Y) indicate the real markers corresponding to those virtual markers can be captured by only one motion capture cameras in the configuration; and can be colored with red (i.e., the circles with R) indicate the real markers corresponding to those virtual markers cannot be captured by any motion capture camera in the configuration.

Figure 9:
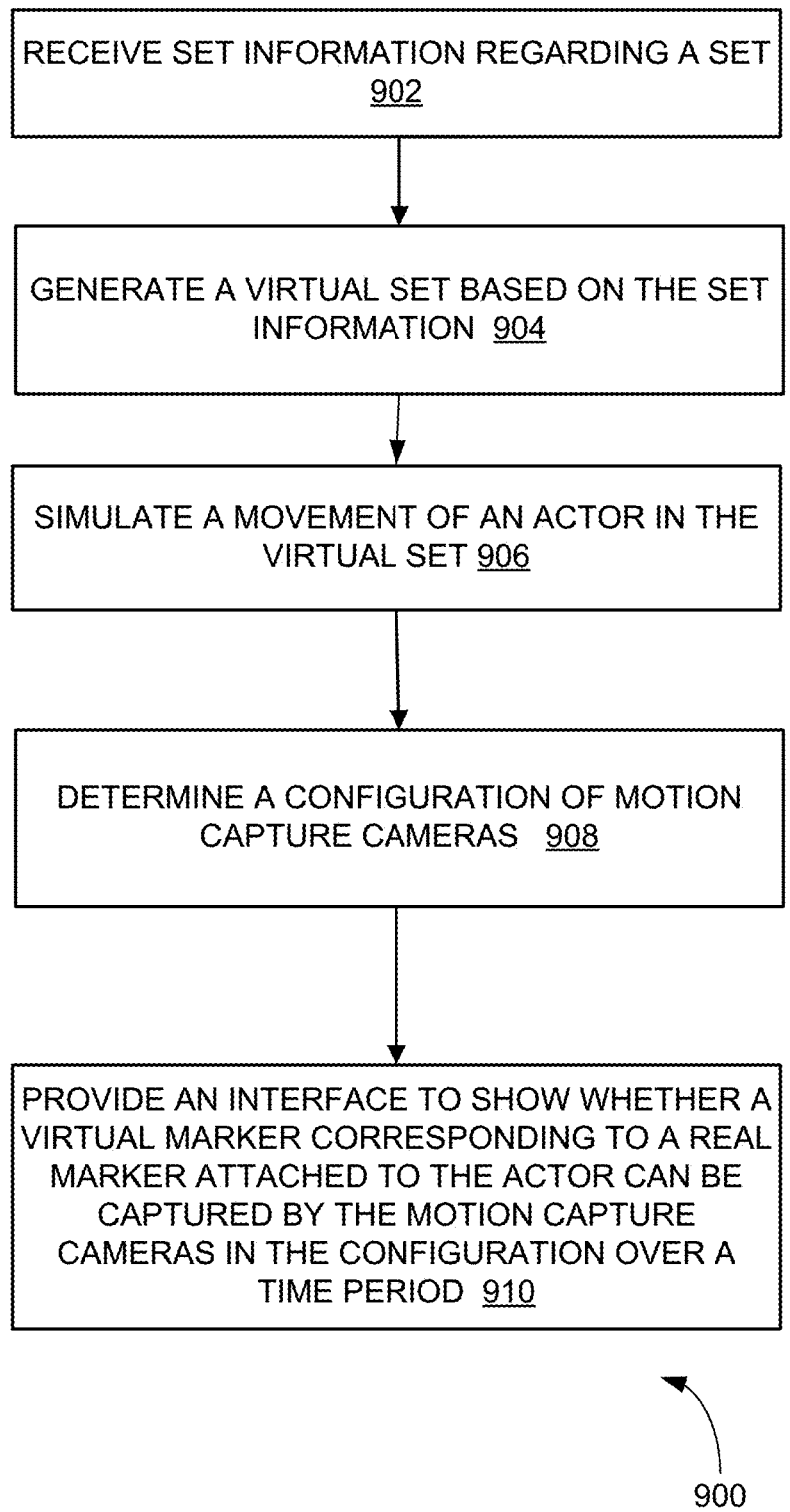
FIG. 9 is a flowchart of an exemplary method for facilitating a determination whether a given marker attached to an actor can be captured by motion capture cameras placed in a specific configuration.

Attention is now directed to FIG. 9. FIG. 9 is a flowchart of an exemplary method 900 for facilitating a determination whether a given marker attached to an actor can be captured by motion capture cameras placed in a specific configuration. The method presented in FIG. 9 and described below is intended to be illustrative and non-limiting. The particular series of processing steps depicted in FIG. 9 is not intended to be limiting. It is appreciated that the processing steps may be performed in an order different from that depicted in FIG. 9 and that not all the steps depicted in FIG. 9 need be performed. In certain implementations, the method 900 may be generated by a computer system, such as the system 1000 shown in FIG. 10.

In some embodiments, the method depicted in method 900 may be generated in one or more processing devices (e.g., a digital processor, an analog processor, a digital circuit designed to process information, an analog circuit designed to process information, a state machine, and/or other mechanisms for electronically processing information). The one or more processing devices may include one or more devices executing some or all of the operations of method 900 in response to instructions stored electronically on an electronic storage medium. The one or more processing devices may include one or more devices configured through hardware, firmware, and/or software to be specifically designed for execution of one or more of the operations of method 900.

At 902, set information regarding a set can be received. The set information received at 902 can include camera configuration information indication a configuration regarding a main camera configured to capture the set, position information of one or more actors and/or objects in the set, movement information regarding the one or more actors and/or the objects over the time period, and/or any other aspects. In some embodiments, the set information may be received from various sources such as a document that describes scene design of the set, a director, a program configured to analyze one or more images of a set, just to name a few. In some implementations, operations involved in 902 may be performed by a set information component the same as or substantially similar to set information component 804 described and illustrated herein.

At 904, a virtual set may be generated based on the set information received at 902. The virtual set generated at 904 may include one or more virtual actors corresponding to the one or more actors in the set and/or virtual objects corresponding to the one or more objects in the set. The positions of virtual actors and objects in the virtual set may reflect the positions of the corresponding to actors and objects in the set. An example of a virtual set that can be generated at 904 is illustrated in FIG. 3. In some implementations, operations involved in 904 may be performed by virtual set component the same as or substantially similar to virtual set generation component 806 described and illustrated herein.

At 906, a movement of a virtual actor in the virtual set generated at 904 can be simulated. In some examples, the virtual actor movement simulation at 906 can be automatically performed based on movement information included in the set information received at 904. In some examples, the virtual actor movement simulation at 906 can be performed based user inputs. For example, a user may be enabled to provide inputs to drag the virtual actor along a path in the virtual set to simulate the movement. In some implementations, operations involved in 904 may be performed by virtual set component the same as or substantially similar to virtual set generation component 806 described and illustrated herein.

At 908, a configuration of motion capture cameras to be placed in the physical set can be determined based on the virtual set generated at 904 and the virtual actor simulation performed at 906. In some embodiments, the determination made at 908 can be based on the indication information indicating visibilities of regions in the set through the main camera as described and illustrated herein. For instance, at 908, it may be determined that no motion capture cameras may be placed to capture regions that are not viewable at all, more motion capture cameras may be placed to capture regions that are fully viewable, and an appropriate number of motion capture cameras may be placed to capture regions that are partially viewable. In some embodiments, operations involved in 908 may include determining one or more positions in the virtual for optimally placing the motion capture cameras FIG. 6 illustrates one example of a virtual set that is marked with indicators indicating positions determined by the motion capture camera placement component 806 for placing motion capture cameras described and illustrated herein.

A number of factors may be taken into consideration for the determination of optimal placement of the motion capture camera placement at 908. For example, the factors may include a number of the motion capture cameras that are available and can be placed in the physical set, a required minimum distance between a given motion capture camera and the actor 106, a minimum distance between a given motion capture camera and one or more objects in the set, and/or any other factors. Such factors may be taken into consideration for a good coverage of the actor 106's movement for capturing the actor 106's motion. In some implementations, operations involved in 908 may be performed by a motion capture camera placement component the same as or substantially similar to motion capture camera placement component 808 described and illustrated herein.

At 910, an interface may be provided to show whether a virtual marker attached to the actor can be captured by motion capture cameras in the specific configuration over a time period. FIGS. 7A-B illustrate an example of such an interface. As shown, in the interface, a virtual marker corresponding to a real marker attached to the actor may be displayed with a color to indicate whether the real marker can be captured by the motion capture cameras placed in the specific configuration (such as shown in FIG. 6) at the given point of time during the simulated movement of the virtual actor. For example, virtual markers can be colored with green (i.e., the circles with G) indicate the real markers corresponding to those virtual markers can be captured by at least two motion capture cameras in the configuration; can be colored with yellow (i.e., the circles with Y) indicate the real markers corresponding to those virtual markers can be captured by only one motion capture cameras in the configuration; and can be colored with red (i.e., the circles with R) indicate the real markers corresponding to those virtual markers cannot be captured by any motion capture camera in the configuration. In some implementations, operations involved in 910 may be performed by a motion capture camera visibility determination component the same as or substantially similar to motion capture camera visibility determination component 810 described and illustrated herein.

Figure 10:
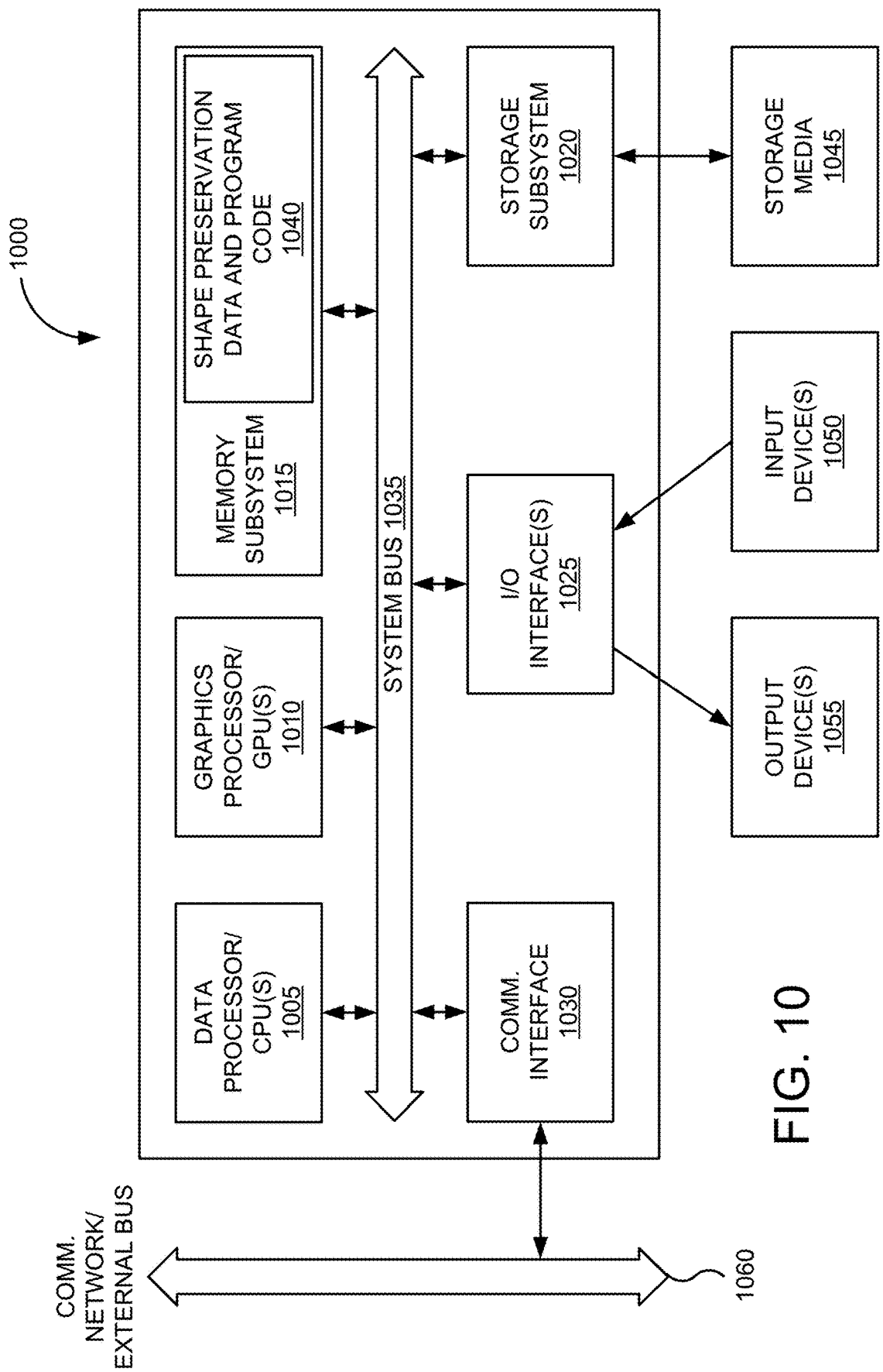
FIG. 10 is a block diagram of computer system that may incorporate an embodiment, be incorporated into an embodiment, or be used to practice any of the innovations, embodiments, and/or examples found within this disclosure

FIG. 10 is a block diagram of computer system 1000 that may incorporate an embodiment, be incorporated into an embodiment, or be used to practice any of the innovations, embodiments, and/or examples found within this disclosure. FIG. 10 is merely illustrative of a computing device, general-purpose computer system programmed according to one or more disclosed techniques, or specific information processing device for an embodiment incorporating an invention whose teachings may be presented herein and does not limit the scope of the invention as recited in the claims. One of ordinary skill in the art would recognize other variations, modifications, and alternatives.

Computer system 1000 can include hardware and/or software elements configured for performing logic operations and calculations, input/output operations, machine communications, or the like. Computer system 1000 may include familiar computer components, such as one or more one or more data processors or central processing units (CPUs) 1005, one or more graphics processors or graphical processing units (GPUs) 1010, memory subsystem 1015, storage subsystem 1020, one or more input/output (I/O) interfaces 1025, communications interface 1030, or the like. Computer system 1000 can include system bus 1035 interconnecting the above components and providing functionality, such connectivity and inter-device communication. Computer system 1000 may be embodied as a computing device, such as a personal computer (PC), a workstation, a mini-computer, a mainframe, a cluster or farm of computing devices, a laptop, a notebook, a netbook, a PDA, a smartphone, a consumer electronic device, a gaming console, or the like.

The one or more data processors or central processing units (CPUs) 1005 can include hardware and/or software elements configured for executing logic or program code or for providing application-specific functionality. Some examples of CPU(s) 1005 can include one or more microprocessors (e.g., single core and multi-core) or micro-controllers. CPUs 1005 may include 4-bit, 8-bit, 12-bit, 10-bit, 32-bit, 64-bit, or the like architectures with similar or divergent internal and external instruction and data designs. CPUs 1005 may further include a single core or multiple cores. Commercially available processors may include those provided by Intel of Santa Clara, Calif. (e.g., x86, x86_64, PENTIUM, CELERON, CORE, CORE 12, CORE ix, ITANIUM, XEON, etc.), by Advanced Micro Devices of Sunnyvale, Calif. (e.g., x86, AMD 64, ATHLON, DURON, TURION, ATHLON XP/64, OPTERON, PHENOM, etc).

Commercially available processors may further include those conforming to the Advanced RISC Machine (ARM) architecture (e.g., ARMv7-9), POWER and POWERPC architecture, CELL architecture, and or the like. CPU(s) 1005 may also include one or more field-gate programmable arrays (FPGAs), application-specific integrated circuits (ASICs), or other microcontrollers. The one or more data processors or central processing units (CPUs) 1005 may include any number of registers, logic units, arithmetic units, caches, memory interfaces, or the like. The one or more data processors or central processing units (CPUs) 1005 may further be integrated, irremovably or moveably, into one or more motherboards or daughter boards.

The one or more graphics processor or graphical processing units (GPUs) 1010 can include hardware and/or software elements configured for executing logic or program code associated with graphics or for providing graphics-specific functionality. GPUs 1010 may include any conventional graphics processing unit, such as those provided by conventional video cards. Some examples of GPUs are commercially available from NVIDIA, ATI, and other vendors. In various embodiments, GPUs 1010 may include one or more vector or parallel processing units. These GPUs may be user programmable, and include hardware elements for encoding/decoding specific types of data (e.g., video data) or for accelerating 12D or 13D drawing operations, texturing operations, shading operations, or the like. The one or more graphics processors or graphical processing units (GPUs) 1010 may include any number of registers, logic units, arithmetic units, caches, memory interfaces, or the like. The one or more data processors or central processing units (CPUs) 1005 may further be integrated, irremovably or moveably, into one or more motherboards or daughter boards that include dedicated video memories, frame buffers, or the like.

Memory subsystem 1015 can include hardware and/or software elements configured for storing information. Memory subsystem 1015 may store information using machine-readable articles, information storage devices, or computer-readable storage media. Some examples of these articles used by memory subsystem 1070 can include random access memories (RAM), read-only-memories (ROMS), volatile memories, non-volatile memories, and other semiconductor memories. In various embodiments, memory subsystem 1015 can include shape preservation data and program code 1040.

Storage subsystem 1020 can include hardware and/or software elements configured for storing information. Storage subsystem 1020 may store information using machine-readable articles, information storage devices, or computer-readable storage media. Storage subsystem 1020 may store information using storage media 1045. Some examples of storage media 1045 used by storage subsystem 1020 can include floppy disks, hard disks, optical storage media such as CD-ROMS, DVDs and bar codes, removable storage devices, networked storage devices, or the like. In some embodiments, all or part of shape preservation data and program code 1040 may be stored using storage subsystem 1020.

In various embodiments, computer system 1000 may include one or more hypervisors or operating systems, such as WINDOWS, WINDOWS NT, WINDOWS XP, VISTA, WINDOWS 7 or the like from Microsoft of Redmond, Wash., Mac OS or Mac OS X from Apple Inc. of Cupertino, Calif., SOLARIS from Sun Microsystems, LINUX, UNIX, and other UNIX-based or UNIX-like operating systems. Computer system 1000 may also include one or more applications configured to execute, perform, or otherwise generate techniques disclosed herein. These applications may be embodied as shape preservation data and program code 1040. Additionally, computer programs, executable computer code, human-readable source code, shader code, rendering engines, or the like, and data, such as image files, models including geometrical descriptions of objects, ordered geometric descriptions of objects, procedural descriptions of models, scene descriptor files, or the like, may be stored in memory subsystem 1015 and/or storage subsystem 1020.

The one or more input/output (I/O) interfaces 1025 can include hardware and/or software elements configured for performing I/O operations. One or more input devices 1050 and/or one or more output devices 1055 may be communicatively coupled to the one or more I/O interfaces 1025.

The one or more input devices 1050 can include hardware and/or software elements configured for receiving information from one or more sources for computer system 1000. Some examples of the one or more input devices 1050 may include a computer mouse, a trackball, a track pad, a joystick, a wireless remote, a drawing tablet, a voice command system, an eye tracking system, external storage systems, a monitor appropriately configured as a touch screen, a communications interface appropriately configured as a transceiver, or the like. In various embodiments, the one or more input devices 1050 may allow a user of computer system 1000 to interact with one or more non-graphical or graphical user interfaces to enter a comment, select objects, icons, text, user interface widgets, or other user interface elements that appear on a monitor/display device via a command, a click of a button, or the like.

The one or more output devices 1055 can include hardware and/or software elements configured for outputting information to one or more destinations for computer system 1000. Some examples of the one or more output devices 1055 can include a printer, a fax, a feedback device for a mouse or joystick, external storage systems, a monitor or other display device, a communications interface appropriately configured as a transceiver, or the like. The one or more output devices 1055 may allow a user of computer system 1000 to view objects, icons, text, user interface widgets, or other user interface elements.

A display device or monitor may be used with computer system 1000 and can include hardware and/or software elements configured for displaying information. Some examples include familiar display devices, such as a television monitor, a cathode ray tube (CRT), a liquid crystal display (LCD), or the like.

Communications interface 1030 can include hardware and/or software elements configured for performing communications operations, including sending and receiving data. Some examples of communications interface 1030 may include a network communications interface, an external bus interface, an Ethernet card, a modem (telephone, satellite, cable, ISDN), (asynchronous) digital subscriber line (DSL) unit, FireWire interface, USB interface, or the like. For example, communications interface 1030 may be coupled to communications network/external bus 1080, such as a computer network, to a FireWire bus, a USB hub, or the like. In other embodiments, communications interface 1030 may be physically integrated as hardware on a motherboard or daughter board of computer system 1000, may be generated as a software program, or the like, or may be generated as a combination thereof.

In various embodiments, computer system 1000 may include software that enables communications over a network, such as a local area network or the Internet, using one or more communications protocols, such as the HTTP, TCP/IP, RTP/RTSP protocols, or the like. In some embodiments, other communications software and/or transfer protocols may also be used, for example IPX, UDP or the like, for communicating with hosts over the network or with a device directly connected to computer system 1000.

As suggested, FIG. 10 is merely representative of a general-purpose computer system appropriately configured or specific data processing device capable of generating or incorporating various embodiments of an invention presented within this disclosure. Many other hardware and/or software configurations may be apparent to the skilled artisan which are suitable for use in generating an invention presented within this disclosure or with various embodiments of an invention presented within this disclosure. For example, a computer system or data processing device may include desktop, portable, rack-mounted, or tablet configurations. Additionally, a computer system or information processing device may include a series of networked computers or clusters/grids of parallel processing devices. In still other embodiments, a computer system or information processing device may perform techniques described above as generated upon a chip or an auxiliary processing board.

Various embodiments of any of one or more inventions whose teachings may be presented within this disclosure can be generated in the form of logic in software, firmware, hardware, or a combination thereof. The logic may be stored in or on a machine-accessible memory, a machine-readable article, a tangible computer-readable medium, a computer-readable storage medium, or other computer/machine-readable media as a set of instructions adapted to direct a central processing unit (CPU or processor) of a logic machine to perform a set of steps that may be disclosed in various embodiments of an invention presented within this disclosure. The logic may form part of a software program or computer program product as code modules become operational with a processor of a computer system or an information-processing device when executed to perform a method or process in various embodiments of an invention presented within this disclosure. Based on this disclosure and the teachings provided herein, a person of ordinary skill in the art will appreciate other ways, variations, modifications, alternatives, and/or methods for generating in software, firmware, hardware, or combinations thereof any of the disclosed operations or functionalities of various embodiments of one or more of the presented inventions.

The disclosed examples, implementations, and various embodiments of any one of those inventions whose teachings may be presented within this disclosure are merely illustrative to convey with reasonable clarity to those skilled in the art the teachings of this disclosure. As these implementations and embodiments may be described with reference to exemplary illustrations or specific figures, various modifications or adaptations of the methods and/or specific structures described can become apparent to those skilled in the art. All such modifications, adaptations, or variations that rely upon this disclosure and these teachings found herein, and through which the teachings have advanced the art, are to be considered within the scope of the one or more inventions whose teachings may be presented within this disclosure. Hence, the present descriptions and drawings should not be considered in a limiting sense, as it is understood that an invention presented within a disclosure is in no way limited to those embodiments specifically illustrated.

Accordingly, the above description and any accompanying drawings, illustrations, and figures are intended to be illustrative but not restrictive. The scope of any invention presented within this disclosure should, therefore, be determined not with simple reference to the above description and those embodiments shown in the figures, but instead should be determined with reference to the pending claims along with their full scope or equivalents.

What is claimed is:

1. A method for facilitating motion capture, the method being implemented by a processor configured to execute machine-readable instructions, the method comprising:
receiving physical set information regarding a physical set, the physical set information including camera information indicating a configuration of a main camera configured to capture the physical set, and position information indicating location of one or more actors and objects with respect to coordinates of the physical set;
generating a virtual set representing the physical set based on the physical set information, the virtual set including representations of the one or more actors and the objects in the physical set;
determining, based on the virtual set, whether a region in the physical set is fully viewable, partially viewable, or not viewable through the main camera;
generating indicating information indicating whether the region is fully viewable partially viewable, or not viewable through the main camera;
presenting, visually, the indication information to a user such that the region is marked to indicate the region is fully viewable, partially viewable, or not viewable through the main camera, wherein the indication information comprises marking the region with an identifier based on whether the region is fully viewable, partially viewable, or not viewable;
determining, based on the indication information, a configuration of motion capture cameras, wherein the determination of the configuration of the motion capture cameras includes determining positions in the physical set for placing the motion capture cameras to capture motion of the actor and the objects in the physical set, wherein the determined positions in the physical set for the motion capture cameras permit each marker on an actor's face and/or body to be captured by at least two cameras over a duration of a performance; and
marking the virtual set with indicators that identify the determined positions for the motion capture cameras.

2. The method of claim 1, further comprising:
receiving movement information indicating a movement of an actor in the physical set over a time period; and
simulating a movement of the actor in the virtual set based on the movement information; and, wherein the determination whether the region is fully viewable, partially viewable, or not viewable through the main camera is further based on the simulated movement of the actor in the virtual set.

3. The method of claim 2, wherein the movement information further indicating a movement of an object in the physical set over the time period; and wherein the method further comprises:
simulating a movement of the object in the virtual set based on the movement information; and, wherein the determination whether the region is fully viewable, partially viewable, or not viewable through the main camera is further based on the simulated movement of the object in the virtual set.

4. The method of claim 1, wherein the main camera configuration indicates at least one of the following: a position of the main camera in the physical set, an orientation of the main camera, a field of view of the main camera, and a height of the main camera.

5. The method of claim 1, wherein the determination of the one or more positions for placing the one or more capture cameras is based on at least one of the following: a predetermined minimum distance between any two motion capture cameras to be placed, a predetermined minimum distance between a given motion camera to be placed and the one or more actors, and a quantity of the motion capture cameras that are available to be placed.

6. The method of claim 1, further comprising:
providing an interface to show whether a virtual marker corresponding to a real marker attached to the one or more actors can be captured by the motion capture cameras in the configuration over a time period.

7. The method of claim 6, wherein the virtual marker is colored with a first color when the real marker corresponding to the virtual marker can be captured by at least two motion capture cameras in the configuration, with a second color when the real marker corresponding to the virtual marker can be captured only by one motion capture camera in the configuration, and a third color when the real marker corresponding to the virtual marker can be captured any motion capture camera in the configuration.

8. The method of claim 1, wherein the physical set is a motion picture production set.

9. The method of claim 1, wherein the indication information is presented as a heat map to indicate whether a region in the physical set can be fully viewable, partially viewed, or not viewable in the physical set based at least in part on the motion of the one or more actors and the configuration of the main camera placed in the physical set.

10. The method of claim 1, wherein the identifier is a color.

11. A system for facilitating motion capture, the system comprising one or more processors configured to execute machine-readable instructions such that when the machine-readable instructions are executed, the one or more processors are caused to perform:
receiving physical set information regarding a physical set, the physical set information including camera information indicating a configuration of a main camera configured to capture the physical set, and position information indicating location of one or more actors and objects with respect to coordinates in the physical set;
generating a virtual set representing the physical set based on the physical set information, the virtual set including representations of the one or more actors and the objects in the physical set;
determining, based on the virtual set, whether a region in the physical set is fully viewable, partially viewable, or not viewable through the main camera;
generating indicating information indicating whether the region is fully viewable partially viewable, or not viewable through the main camera;
presenting, visually, the indication information to a user such that the region is marked to indicate the region is fully viewable, partially viewable, or not viewable through the main camera, wherein the indication information comprises marking the region with an identifier based on whether the region is fully viewable, partially viewable, or not viewable;
determining, based on the indication information, a configuration of motion capture cameras, wherein the determination of the configuration of the motion capture cameras includes determining positions in the physical set placing the motion capture cameras to capture motion of the actor and the objects in the physical set, wherein the determined positions in the physical set for the motion capture cameras permit each marker on an actor's face and/or body to be captured by at least two cameras over a duration of a performance; and
marking the virtual set with indicators that identify the determined positions for the motion capture cameras.

12. The system of claim 11, wherein the one or more processors are further caused to perform:
receiving movement information indicating a movement of an actor in the physical set over a time period; and
simulating a movement of the actor in the virtual set based on the movement information; and, wherein the determination whether the region is fully viewable, partially viewable, or not viewable through the main camera is further based on the simulated movement of the actor in the virtual set.

13. The system of claim 12, wherein the movement information further indicating a movement of an object in the physical set over the time period; and wherein the one or more processors are further caused to perform:
simulating a movement of the object in the virtual set based on the movement information; and, wherein the determination whether the region is fully viewable, partially viewable, or not viewable through the main camera is further based on the simulated movement of the object in the virtual set.

14. The system of claim 11, wherein the main camera configuration indicates at least one of the following: a position of the main camera in the physical set, an orientation of the main camera, a field of view of the main camera, and a height of the main camera.

15. The system of claim 11, wherein the determination of the one or more positions for placing the one or more capture cameras is based on at least one of the following: a predetermined minimum distance between any two motion capture cameras to be placed, a predetermined minimum distance between a given motion camera to be placed and the one or more actors, and a quantity of the motion capture cameras that are available to be placed.

16. The system of claim 11, wherein the one or more processors are further caused to perform:
providing an interface to show whether a virtual marker corresponding to a real marker attached to the one or more actors can be captured by the motion capture cameras in the configuration over a time period.

17. The system of claim 16, wherein the virtual marker is colored with a first color when the real marker corresponding to the virtual marker can be captured by at least two motion capture cameras in the configuration, with a second color when the real marker corresponding to the virtual marker can be captured only by one motion capture camera in the configuration, and a third color when the real marker corresponding to the virtual marker can be captured any motion capture camera in the configuration.

18. The system of claim 11, wherein the identifier is a color.

\* \* \* \* \*